United States Patent

Katayama et al.

[11] Patent Number: 5,863,081
[45] Date of Patent: Jan. 26, 1999

[54] PIPE CONNECTION STRUCTURE

[75] Inventors: Takashi Katayama; Satoshi Kasahara; Hidekazu Takahashi; Heigou Suzuki, all of Shizuoka-ken, Japan

[73] Assignees: Suzuki Motor Corporation; Kohzu Manufacturing Co., Ltd., both of Japan

[21] Appl. No.: 908,112

[22] Filed: Aug. 11, 1997

[30] Foreign Application Priority Data

Aug. 23, 1996 [JP] Japan ................................. 8-241455

[51] Int. Cl.[6] ........................................................ F16L 5/02
[52] U.S. Cl. ............................... 285/203; 285/222; 29/512
[58] Field of Search ................................... 285/202, 203, 285/222; 29/512, 513, 890.038, 890.043

[56] References Cited

U.S. PATENT DOCUMENTS

| | | | |
|---|---|---|---|
| 1,382,049 | 6/1921 | Aspinwall | 285/222 |
| 1,396,362 | 11/1921 | Estes | 285/222 |
| 1,481,217 | 1/1924 | Maloy | 285/203 X |
| 2,096,823 | 10/1937 | Penney | 285/202 |
| 2,369,895 | 2/1945 | Hanrahan | 285/203 X |

*Primary Examiner*—Dave W. Arola
*Attorney, Agent, or Firm*—Morrison Law Firm

[57] ABSTRACT

An oil strainer head is attached to an oil suction pipe using a machined bulge flange in the pipe. A connection flange on the oil strainer head is fitted over the lower end of the pipe below the bulge flange. The bulge flange is then crimped in an outward curve to deform the connection flange into a corresponding outward curve captured within the crimped lower end. This structure eliminates the need for reinforcement and welding and produces a strong, non-leaking joint that reduces the number of parts and manufacturing operations.

6 Claims, 6 Drawing Sheets

PIPE CONNECTION STRUCTURE

FIELD OF THE INVENTION

This invention relates to a pipe connection structure that improves the joint between a pipe member and a correspondent member that connects to the pipe member, for example, between a pipe member that includes an oil strainer and an umbrella-shaped member that has a screen attached to its end.

BACKGROUND

Referring to FIG. 6 an engine 1 of an automobile includes a lubrication system that uses, among other things, an oil pan 2, an oil pump 3 and an oil strainer 4. Oil strainer 4 conducts oil 5 from oil pan 2 to oil pump 3.

Referring now to FIG. 7, oil strainer 4, in brief, comprises pipe member 6, which forms the oil path, and an umbrella-shaped member 8 attached to a lower end 6a of pipe member 6. A screen 7 covers the lower end of umbrella-shaped member 8.

Screen 7 prevents impurities in the oil 5 from being sucked in, and umbrella-shaped member 8 holds this screen 7 to prevent air from being sucked in when the surface of the oil in oil pan 2 is tilted.

An enlarged view of the connection between pipe member 6 and umbrella-shaped member 8 is shown in FIG. 8. An axially directed cylindrical connection flange 9 is formed in the upper center of umbrella-shaped member 8. Lower end 6a of pipe member 6 is inserted into connection flange 9 in the upper part of umbrella-shaped member 8. After insertion, reinforcement 10, which has an L-shaped cross-section, is slid down from its initial position on pipe member 6 onto connection flange 9 and the upper part of umbrella-shaped member 8. The upright upper end of reinforcement 10 is joined integrally to the outer circumference of the upper end of connection flange 9 and of pipe member 6 by means of weld W1. The upper part of umbrella-shaped member 8 and the horizontal part of reinforcement 10 are joined integrally by means of spot weld W2.

Reinforcement 10 serves not only to join pipe member 6 and umbrella-shaped member 8 but also to form a seal between pipe member 6 and umbrella-shaped member 8. That is, reinforcement 10 is attached in order to improve the seal of oil strainer 4 and in order to improve the strength.

As shown in FIGS. 6 and 7, an upper end 6b of pipe member 6 includes a flange 11 for attachment of pipe member 6 to oil pump 3. A notch or groove 13 in flange 11 adjacent upper end 6b accommodates an 0-ring 12. 0-ring 12 seals upper end 6b of pipe member 6 to an oil pump case 14 of oil pump 3.

An oil gauge 18 is inserted into a level gauge guide 17 which passes alongside a cylinder block 15 and cylinder head 16. An end 18a of oil level gauge 18 extends into oil 5 in oil pan 2. As is conventional, oil level gauge 18 includes graduations thereon to indicate the level of oil 5 in oil pan 2.

A cylinder head bolt 19 is one of many that join cylinder block 15 and cylinder head 16. A chain adjuster 20 is disposed within cylinder head 16 to adjust the tension on a chain (not shown) for connection to oil pump 3. Oil is pumped under pressure by oil pump 3 though an oil filter and a main gallery to cylinder head 16. The oil is diverted around the circumference of cylinder head bolt 19, to chain adjuster 20. An oil pressure switch 21 monitors oil pressure. An oil drain hole 22 permits draining oil 5 from oil pan 2.

Examined patent HEI 7-4631 [1995] discloses a crimping member and crimping structure. In what is disclosed, a crimping part is provided that has a cylindrical part, a flange, part of whose circumferential wall is plastically deformed. A notch is formed in a flange on one end of cylindrical part. The cylindrical part is inserted through a connection hole formed in a correspondent member to be joined to this crimping member. The notch is fitted into a notch fitting part formed on the correspondent member. The part that passes through the connection hole of the cylindrical part is plastically deformed. The correspondent member is crimped with this plastically deformed part and the flange.

Examined utility model HEI 5-22344 [1993] discloses an anchoring structure for a first plate and second plate that employs a crimping cylinder on the second plate fitted rather tightly onto the outer circumference of a cylindrical protrusion on the first plate. Striking pressure is applied to the upper end face of this crimping cylinder and cylindrical protrusion to form flat ribs on the cylindrical protrusion. Rib crimping surrounds the flat rib in the crimping cylinder, thereby holding in place the first plate and second plate.

Unexamined utility model SHO 58-71422 [1983] discloses a fence in which the ends of a steel plate are crimped and both ends of multiple pipe-shaped upright crosspieces are fitted into cylindrically flanged through-holes on an upper frame and lower frame of molded steel plate. Crimping spots for the upright crosspieces are cut away in these through-holes and expanded outward, engaging with the cylindrical flanges of the upper frame and lower frame. The upright crosspieces and the upper and lower frames are held in place by this engagement part and by bulges provided on the outer upright crosspieces of the through-holes.

In the prior art described above, because the oil strainer pipe member and umbrella-shaped member are joined and held in place with a reinforcement, there is the problem that the number of parts and the attachment operations are increased by the portion attributable to the reinforcement, and the running costs of the equipment itself are that much higher. Because the pipe member, umbrella-shaped member, and reinforcement are joined by welding, there is the additional problem that the process of manufacturing the oil strainer is more complicated. If the reinforcement is omitted, the strength of the joint between the pipe member and the umbrella-shaped member is reduced.

Also, with the crimping member and crimping structure disclosed in examined patent HEI 7-4631 [1995], the application of excessive force to the flange formed in the crimping member or to the corresponding member that is fitted into the crimping member may cause a crack in the connecting hole of the correspondent member, of the same diameter as the cylindrical part. There is the further problem that the corresponding member cannot be made thinner in order to avoid such cracking.

In the first plate and second plate anchoring structure disclosed in examined utility model HEI 5-22344 [1993], crimping is formed surrounding the flat rib on the cylindrical protrusion of the first plate located on the inner side and the flat rib on the crimping cylinder of the second plate located on the outer side, holding the two plates in place. But there is the problem that the cylindrical protrusion of the first plate may be curved. If the cylindrical protrusion is long, it is difficult to form the flat rib. Also, because the crimping part of the first plate and second plate overlap, the crimping to this extent bulges outward, creating the problem that more space is needed and the freedom of design is restricted.

Also, with the fence as disclosed in unexamined utility model SHO 58-71422 [1983], both ends of multiple upright crosspieces are inserted into flanged through-holes on the upper and lower frames, the ends of the crosspieces are expanded open in these through-holes, engaging the cylindrical flange, and the upper and lower frames and the upright crosspieces are held in place by this engagement part and by the bulge that is formed in the upright crosspieces located outside the through-holes. There is a problem with strength, because the crimping is not done in such a way that both the ends of the upright crosspieces and the cylindrical flange of the upper and lower frames curl inward.

OBJECTS AND SUMMARY OF THE INVENTION

It is an object of this invention to provide a pipe connection structure in which the joining of the pipe member and the umbrella-shaped member is done by crimping rather than by welding using a reinforcement.

It is a further object of the invention to provide a pipe connection structure which reduces the number of parts and the number of operations, to reduce the running cost of the equipment itself, and to simplify the process of manufacturing an oil strainer.

Briefly stated, the present invention provides a connection system for attaching an oil strainer head to an oil suction pipe using a machined bulge flange in the pipe. A connection flange on the oil strainer head is fitted over the lower end of the pipe below the bulge flange. The bulge flange is then crimped in an outward curve to deform the lower end and the connection flange into a corresponding outward curve captured within the crimped lower end. This structure eliminates the need for reinforcement and welding and produces a strong, non-leaking joint that reduces the number of parts and manufacturing operations.

According to an embodiment of the invention, there is provided a pipe connection structure, comprising: a pipe member, a positioning flange bulge-formed near the end of the pipe member, a correspondent member, a connection flange on the correspondent member, the connection flange of the correspondent member fitting onto the end of the pipe member and in contact with the flange, and a crimp on an end of the pipe member, and the crimp curling the end about the connection flange.

According to a feature of the invention, there is provided a pipe connection structure, comprising: a pipe member, an umbrella-shaped member, a connection between the pipe member and the umbrella-shaped member, the connection including a flange bulged radially outward from the pipe member, the umbrella-shaped member having a hole therein, the hole being surrounded by a connection flange, the connection flange fitting a lower end of the pipe member, the lower end being crimped in an outward curve upon the connection flange, thereby crimping the connection flange within the outward curve, and a thickness of the umbrella-shaped member being less than a thickness of the lower end, whereby the connection flange is deformed into a curved shape substantially the same as the outward curve of the lower end, whereby the umbrella-shaped member is securely fastened to the pipe member.

According to a still, further feature of the invention, there is provided a method for joining a member to a pipe, comprising: forming an outward bulge flange in the pipe, leaving a lower end of the pipe extending below the bulge flange, forming a hole in the member, forming a connection flange in the member about the hole, fitting the connection flange upon the lower end, with a perimeter of the hole contacting the bulge flange, crimping the lower end in an outward curve toward the bulge flange, wherein the in an connection flange is deformed into a corresponding curve within the outward curve, thereby securely joining the member to the pipe.

The above, and other objects, features and advantages of the present invention will become apparent from the following description read in conjunction with the accompanying drawings, in which like reference numerals designate the same elements.

DESCRIPTION OF THE PREFERRED EMBODIMENTS

Figure 1:
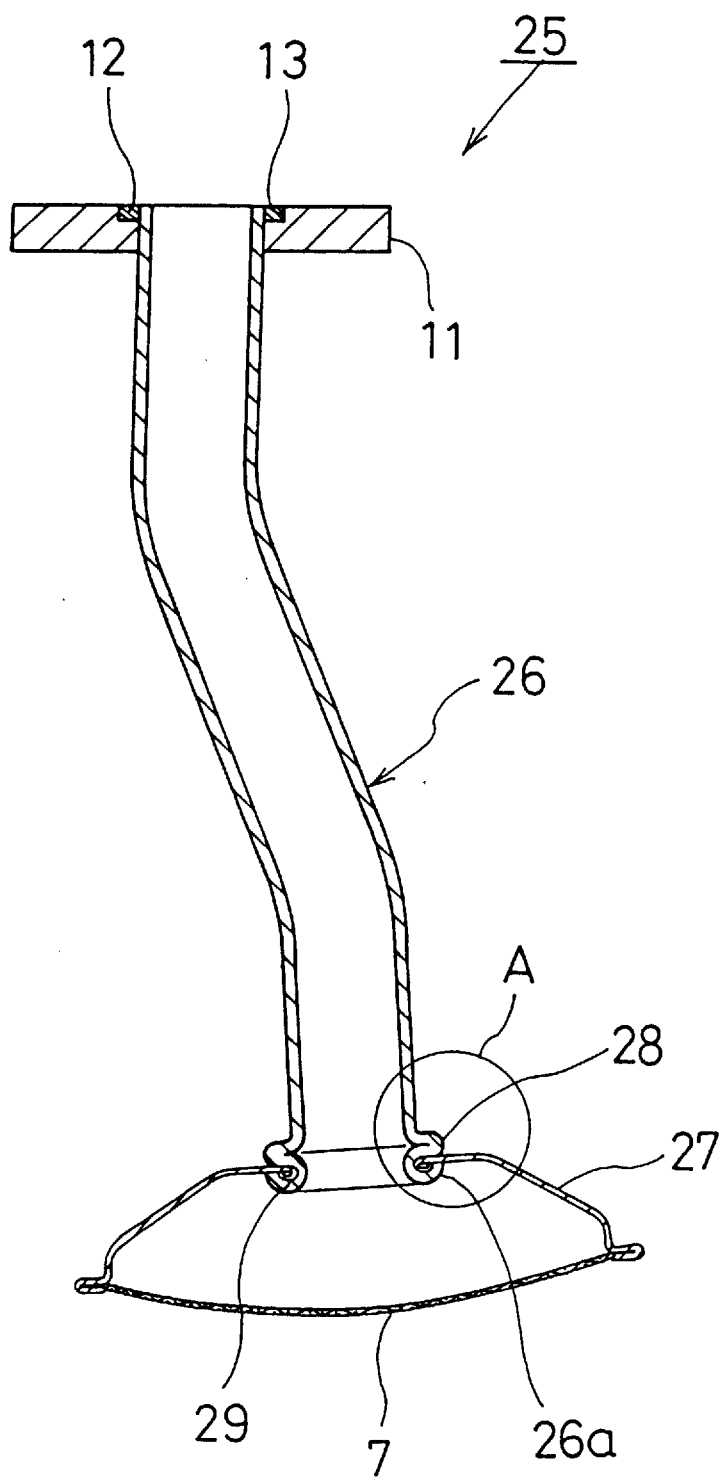
FIG. 1 is a cross-sectional front view of an oil strainer according to an embodiment of the invention.
Figure 2:
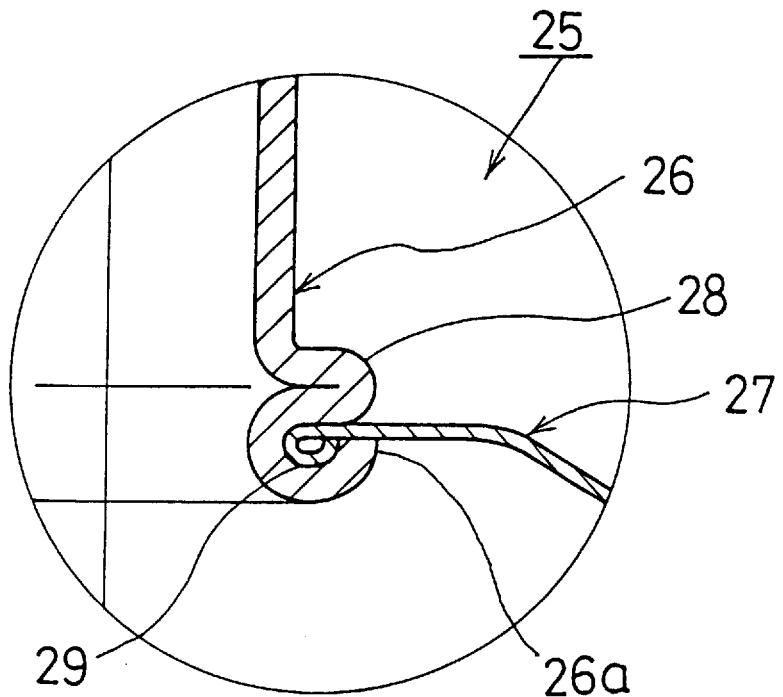
FIG. 2 is an enlarged cross-sectional front view of part A in FIG. 1 showing the end of the pipe member and the connection flange of the umbrella-shaped member crimped together so as to curl inward.

Referring to FIGS. 1 and 2, a pipe member 26 includes a positioning flange 28 bulge-formed near lower end 26a thereof. A cylindrical connection flange 29 of an umbrella-shaped member 27 fits onto lower end 26a of pipe member 26 and contacts flange 28. Lower end 26a of pipe member is crimped to curl outward and upward to retain connection flange 29 within its curvature, and against a lower surface of positioning flange 28. The curvatures of the crimped lower end 26a of pipe member 26 and of cylindrical connection flange 29 of umbrella-shaped member 27 are roughly the same.

The material of umbrella-shaped member 27 is thinner than the material of pipe member 26 so that the curvature of connection flange 29 of umbrella-shaped member 27 is enabled to conform to the curvature of crimped lower end 26a.

The crimp coupling of pipe member 26 and the correspondent member is applied to the connection between pipe member 26 of oil strainer 25 and umbrella-shaped member 27, which is connected to the end of this pipe member 26. The joint is made by crimping together lower end 26a of pipe member 26 and cylindrical connection flange 29 of umbrella-shaped member 27. This results in the effective enlargement of connection flange 29, thereby resisting any tendency for connection flange 29 to be pulled loose from lower end 26a, thereby eliminating the need for the anchoring reinforcement used heretofore.

WORKING EXAMPLE

Figure 6:
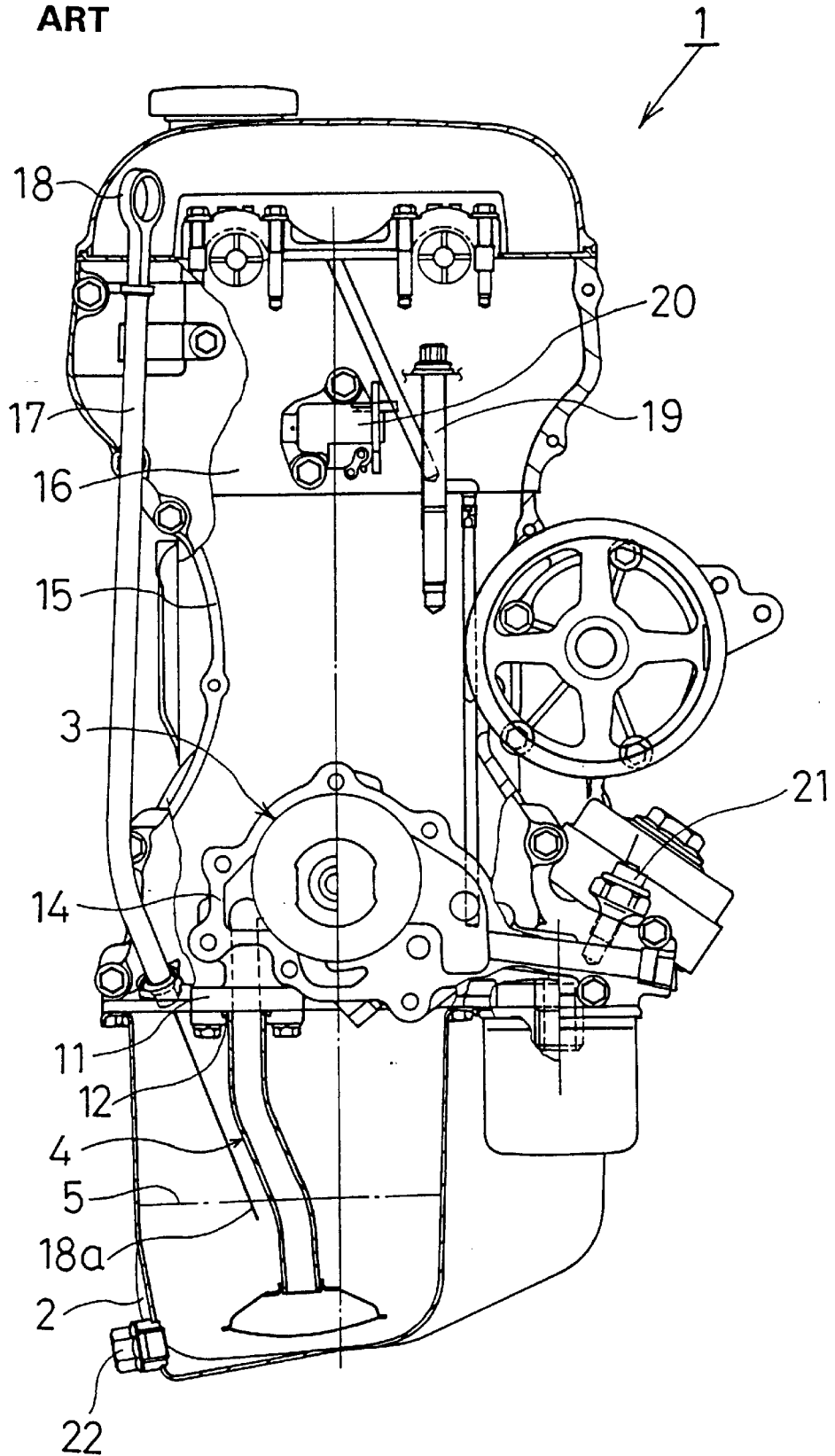
FIG. 6 a cross-sectional front view for describing the interior of an engine having an oil strainer.
Figure 7:
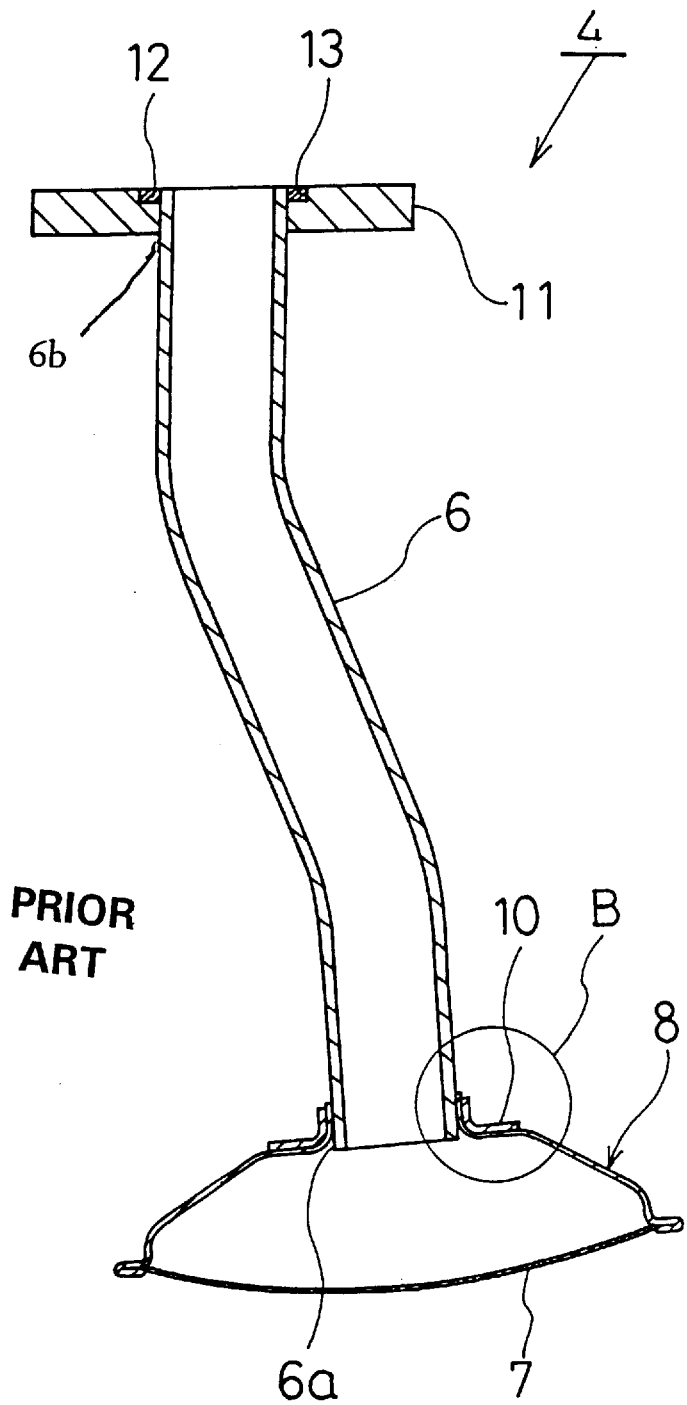
FIG. 7 is a cross-sectional front view of a conventional oil strainer.
Figure 8:
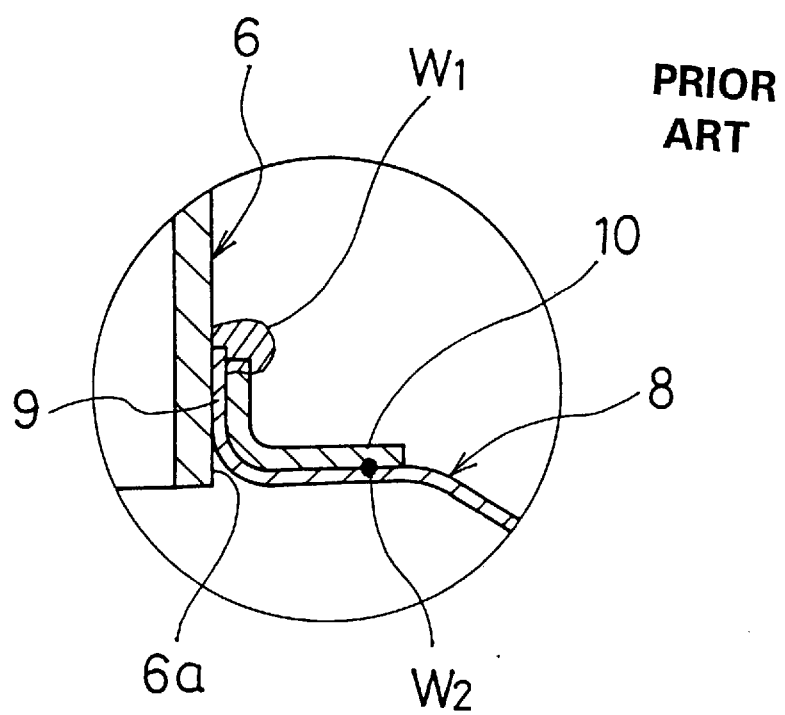
FIG. 8 is a cross-sectional view showing an enlargement of part B in FIG. 7.

A working example of this invention is described with reference to FIGS. 1 and 2, in which the same parts are labeled with the same symbols as in FIGS. 6–8. Oil strainer 25 is part of the lubrication device that supplies lubricating oil to the pistons or connecting rods, etc. of engine 1 (FIG. 6). Oil strainer 25 prevents air or impurities from entering and mixing with the oil.

Positioning flange 28 is provided near lower end 26a of pipe member 26. Umbrella-shaped member 27 is fixed to the lower side of positioning flange 28. Screen 7 is affixed to the lower end of umbrella-shaped member 27.

Figure 3:
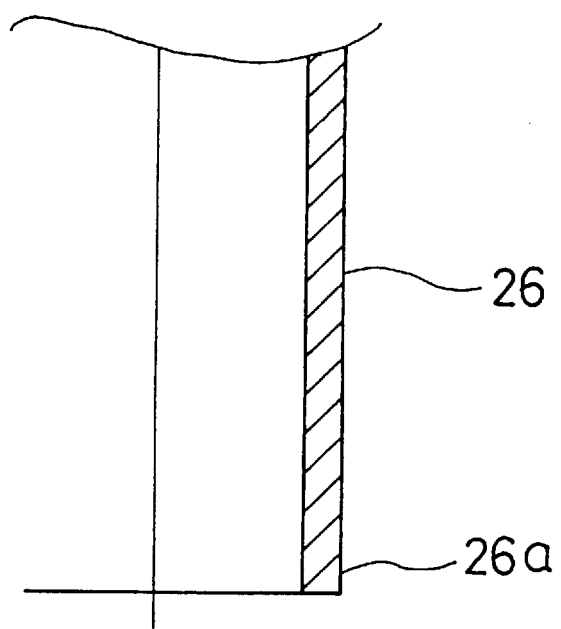
FIG. 3 is part of the diagram showing a cross section to which reference will be made in describing the manufacturing procedure for the joint of FIG. 2.
Figure 4:
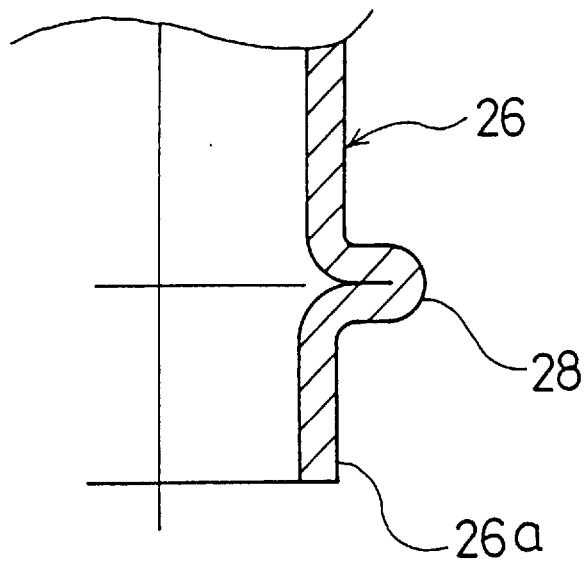
FIG. 4 is a cross section showing a step in the manufacturing of the pipe member of FIG. 2, wherein a portion of the pipe member is deformed outward to form a flange.

The procedure for joining pipe member 26 and umbrella-shaped member 27 of oil strainer 25 that are thus formed is described with reference to FIGS. 3–5. The pipe member 26, as shown in FIG. 3, is deformed by a conventional axial compressive metal forming mold to fold or bulge the material of pipe member 26 outward upon itself to produce flange 28. A lower end 26a extends outward from the remainder of pipe member 26 beyond flange 28.

Figure 5:
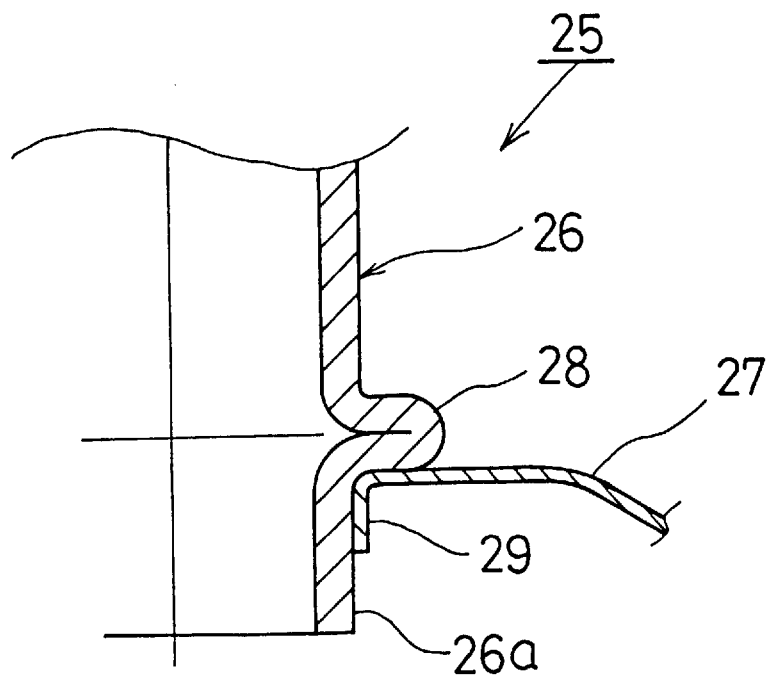
FIG. 5 is a cross section showing a further step in the manufacturing procedure of the pipe member of FIG. 2, showing the pipe member fitted into the umbrella-shaped member.

Referring now to FIG. 5, an inner circumference of umbrella-shaped member 27 is bent downward to form a connection flange 29. Lower end 26a of pipe member 26, is inserted through cylindrical connection flange 29 so that the bent-down connection flange 29 is initially positioned in contact about lower end 26a.

Referring now to FIG. 2, connection flange 29 of umbrella-shaped member 27 is curled outward, by a conventional crimping operation. Because the thickness of connection flange 29 is smaller than the thickness of lower end 26a of pipe member 26, the curvature of lower end 26a is followed closely by the curvature of connection flange 29, thereby integrally joining pipe member 26 and umbrella-shaped member 27. This crimping is done with screen 7 removed. If the material is very stiff or the curvature (described below) is very small, the crimping may be done in several steps to improve the precision of the curvature.

By crimping together lower end 26a of pipe member 26 and connection flange 29 of umbrella-shaped member 27, the curvature (radius) of the crimped parts, lower end 26a of pipe member 26, and connection flange 29 of umbrella-shaped member 27, are roughly the same, thereby avoiding stress concentration. In addition, the close fit between these parts increases the rigidity of the joint.

With the rigidity of the joint thus increased, the occurrence of cracking in the fitting of umbrella-shaped member 27 with pipe member 26 is prevented even when excessive force is applied to flange 28 of pipe member 26 or to umbrella-shaped member 27, which fits onto pipe member 26. This resistance to cracking of umbrella-shaped member 27 permits the use of thinner material in umbrella-shaped member. Preferably, umbrella-shaped member 27 is made of thinner material than pipe member 26.

The disclosed technique for joining umbrella-shaped member 27 to pipe member 26 provides a rigid, large-area durable joint without the need for the reinforcement 10 that was previously used. The resulting large contact forms a labyrinthine shape having a curled cross-section similar to an ampersand character "@". Such a labyrinthine shape provides a good seal against gas and liquid leakage.

Since the pipe member and the correspondent member are crimped together to curl upon themselves, the contact area of the joint is large and the rigidity of the joint is increased, making it possible to avoid cracking that otherwise may occur in the fitting of the correspondent member with the pipe member, even if excessive force is applied to the flange of the pipe member or to the correspondent member that is fitted into the pipe member. This allows the correspondent member to be made thinner than the pipe member. Also, the thinness of the correspondent member makes it easier to perform the crimping operation.

Because the crimp coupling of the pipe member and correspondent member is applied to the connection between the pipe member of the oil strainer and the umbrella-shaped member that is connected to the end of this pipe member, the pipe member of the oil strainer and the umbrella-shaped member can be connected firmly without requiring a reinforcement. Eliminating reinforcement reduces the number of parts. This simplifies parts control. Therefore the running cost of the equipment is reduced.

By eliminating the need for reinforcement, the process of welding, etc. in attaching the reinforcement is eliminated, thereby simplifying the process of manufacturing an oil strainer. Since the joint is made by crimping together the pipe member and the umbrella-shaped member so as to curl upon themselves, the rigidity of the joint of the umbrella-shaped member with the pipe member is improved, and cracking around the circumference of the joint of the umbrella-shaped member with the pipe member is avoided.

The smooth, relatively large-radius curves given to the lower end and the connection flange reduces stress concentration, and improves the life of the joint.

The relatively large radius of curvature of the crimped lower end, and the corresponding curve of the connection flange provides a large contact area which results in a stable connection.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A pipe connection structure, comprising:
    a pipe member;
    a positioning flange bulge-formed near the end of said pipe member;
    a correspondent member;
    a connection flange on said correspondent member;
    said connection flange of said correspondent member fitting onto the end of said pipe member and in contact with said flange;
    a crimp on an end of said pipe member;
    said crimp curling said end into a curled end about said connection flange;
    said crimp having a substantially smooth radius; and
    said connection flange being curled inside said curled end without flattening thereof, whereby a large-area, curved, gas- and liquid-tight connection is formed between said curled connection flange and said curled end.

2. A pipe connection as in claim 1, wherein said connection flange is curled within said crimp at about a same curvature as said end of said pipe member.

3. A pipe connection as in claim 1, wherein said flange is of thinner material than said pipe member.

4. A pipe connection structure, comprising:
    a pipe member;
    an umbrella-shaped member
    a connection between said pipe member and said umbrella-shaped member;
    said connection including a flange bulged radially outward from said pipe member;

said umbrella-shaped member having a hole therein;

said hole being surrounded by an integrally formed connection flange;

said connection flange fitting on a lower end of said pipe member and in contact with said flange;

said lower end being crimped in an outward curve into a curled end upon said connection flange;

said connection flange being smoothly curled inside said curled end without flattening thereof; and a thickness of said umbrella-shaped member being less than a thickness of said lower end, whereby said connection flange is deformed into a curved shape having substantially the same curvature as said outward curve of said curled end, whereby said umbrella-shaped member is securely fastened to said pipe member by a resulting large-contact-area connection which resists leakage of gas and liquid therepast.

5. A method for joining a member to a pipe, comprising:

forming an outward bulge flange in said pipe, leaving a lower end of said pipe extending below said bulge flange;

forming a hole in said member;

integrally forming a connection flange in said member about said hole;

fitting said connection flange upon said lower end, with a perimeter of said hole contacting said bulge flange;

crimping said lower end in an outward curve toward said bulge flange, wherein said connection flange is deformed into a corresponding curve within said outward curve, thereby securely joining said member to said pipe; and said corresponding curve being non-flattened, whereby a large-contact-area connection is formed between said outward curve and said corresponding curve which resists leakage of gas and liquid therepast.

6. A method according to claim 5, wherein the step of crimping includes crimping in a plurality of steps, whereby formation of said outward curve and deformation of said connection flange produces closely fitted smooth curves.

* * * * *